US009624779B2

(12) United States Patent
Schick et al.

(10) Patent No.: US 9,624,779 B2
(45) Date of Patent: Apr. 18, 2017

(54) THERMAL MANAGEMENT ARTICLE AND METHOD OF FORMING THE SAME, AND METHOD OF THERMAL MANAGEMENT OF A SUBSTRATE

(71) Applicant: GENERAL ELECTRIC COMPANY, Schenectady, NY (US)

(72) Inventors: David Edward Schick, Greenville, SC (US); Srikanth Chandrudu Kottilingam, Simpsonville, SC (US); Benjamin Paul Lacy, Greer, SC (US); Yan Cui, Greenville, SC (US); Brian Lee Tollison, Greenville, SC (US)

(73) Assignee: General Electric Company, Schenectady, NY (US)

(*) Notice: Subject to any disclaimer, the term of this patent is extended or adjusted under 35 U.S.C. 154(b) by 728 days.

(21) Appl. No.: 14/053,758

(22) Filed: Oct. 15, 2013

(65) Prior Publication Data

US 2015/0104322 A1    Apr. 16, 2015

(51) Int. Cl.
*F01D 5/18* (2006.01)
*B23P 15/04* (2006.01)
*F01D 25/12* (2006.01)

(52) U.S. Cl.
CPC ............. *F01D 5/185* (2013.01); *B23P 15/04* (2013.01); *F01D 5/187* (2013.01); *F01D 25/12* (2013.01); *B23P 2700/06* (2013.01); *F05D 2230/22* (2013.01); *F05D 2230/232* (2013.01); *F05D 2230/237* (2013.01); *F05D 2230/51* (2013.01);
(Continued)

(58) Field of Classification Search
CPC .......... F01D 5/185; F01D 5/187; F01D 25/12; B23P 15/04; B23P 2700/06; F05D 2230/22; F05D 2250/294; F05D 2230/232; F05D 2230/51; F05D 2260/2212; F05D 2230/237; F05D 2240/11; F05D 2240/12
See application file for complete search history.

(56) References Cited

U.S. PATENT DOCUMENTS 2,522,365 A    9/1950  Greene
4,090,810 A    5/1978  Dakin et al.
(Continued)

FOREIGN PATENT DOCUMENTS

CN    101839150 A    9/2010
WO    2013120999 A1    8/2013

OTHER PUBLICATIONS

"Connecting the drops with 3D printing", ASM Newswire Print/ASM International, Jul. 11, 2013.
(Continued)

*Primary Examiner* — Craig Kim
*Assistant Examiner* — Eldon Brockman
(74) *Attorney, Agent, or Firm* — McNees Wallace & Nurick LLC

(57) ABSTRACT

A thermal management article, a method for forming a thermal management article and a thermal management method are disclosed. Forming a thermal management article includes forming a duct adapted to be inserted into a groove on the surface of a substrate, and attaching the duct to the groove so that the top outer surface of the duct is substantially flush with the surface of the substrate. Thermal management of a substrate includes transporting a fluid through the duct of a thermal management article to alter the temperature of the substrate.

23 Claims, 8 Drawing Sheets

(52) U.S. Cl.
CPC ...... *F05D 2240/11* (2013.01); *F05D 2240/12* (2013.01); *F05D 2250/294* (2013.01); *F05D 2260/2212* (2013.01); *Y10T 29/49343* (2015.01)

(56) References Cited

U.S. PATENT DOCUMENTS

| | | | |
|---|---|---|---|
| 4,142,831 A | 3/1979 | Dakin et al. | |
| 4,156,582 A | 5/1979 | Anderson | |
| 4,185,369 A * | 1/1980 | Darrow | B23P 15/04 165/170 |
| 4,249,291 A * | 2/1981 | Grondahl | B23P 15/04 228/126 |
| 4,259,037 A * | 3/1981 | Anderson | F01D 5/185 416/92 |
| 5,070,937 A * | 12/1991 | Mougin | F28F 1/40 138/38 |
| 5,829,516 A * | 11/1998 | Lavochkin | F28F 1/22 165/171 |
| 6,402,470 B1 | 6/2002 | Kvasnak et al. | |
| 6,676,892 B2 | 1/2004 | Das et al. | |
| 6,723,390 B2 | 4/2004 | Merdan et al. | |
| 6,853,555 B2 * | 2/2005 | Fichera | H01L 23/473 165/80.4 |
| 7,527,475 B1 | 5/2009 | Liang | |
| 7,637,720 B1 * | 12/2009 | Liang | F01D 5/187 416/96 R |
| 7,641,445 B1 | 1/2010 | Liang | |
| 7,695,247 B1 | 4/2010 | Liang | |
| 7,722,327 B1 | 5/2010 | Liang | |
| 7,740,445 B1 | 6/2010 | Liang | |
| 7,857,589 B1 | 12/2010 | Liang | |
| 7,963,745 B1 | 6/2011 | Liang | |
| 7,967,566 B2 | 6/2011 | Liang | |
| 8,584,738 B2 * | 11/2013 | Hurlbert | F28D 1/0246 165/168 |
| 8,806,871 B2 * | 8/2014 | McMasters | F23R 3/14 60/740 |
| 2003/0062145 A1 * | 4/2003 | Frasier | B22C 9/02 164/122.1 |
| 2009/0068021 A1 | 3/2009 | Liang | |
| 2009/0255262 A1 * | 10/2009 | McMasters | F23R 3/14 60/742 |
| 2009/0324841 A1 | 12/2009 | Arrell et al. | |
| 2010/0221121 A1 | 9/2010 | Liang | |
| 2010/0239409 A1 * | 9/2010 | Draper | F01D 5/005 415/1 |
| 2012/0177503 A1 * | 7/2012 | Lee | F01D 5/187 416/96 R |
| 2015/0086408 A1 * | 3/2015 | Kottilingam | B22F 5/04 419/5 |

OTHER PUBLICATIONS

European Search Report and Written Opinion issued in connection with corresponding EP Application No. 14188184.7-1610 dated Feb. 20, 2015.
The State Intellectual Property Office of the People's Republic of China; First Office Action; Jan. 3, 2017, pp. 1-8.

* cited by examiner

THERMAL MANAGEMENT ARTICLE AND METHOD OF FORMING THE SAME, AND METHOD OF THERMAL MANAGEMENT OF A SUBSTRATE

FIELD OF THE INVENTION

The present invention is directed to manufactured articles, methods of manufacturing, and thermal management methods using such manufactured articles and methods. More specifically, the present invention is directed to ducts adapted to be inserted into a groove in the surface of a substrate, methods of forming the ducts and methods for using the ducts to alter the temperature of the substrate.

BACKGROUND OF THE INVENTION

Gas turbine systems are continuously being modified to increase efficiency and decrease cost. One method for increasing the efficiency of a gas turbine system includes increasing the operating temperature of the gas turbine system. To increase the temperature, the gas turbine system must be constructed of materials which can withstand such temperatures during continued use.

In addition to modifying component materials and coatings, the temperature capability of a turbine component may be increased through the use of cooling channels. The cooling channels can be incorporated into metals and alloys used in high temperature regions of gas turbines. However, forming an exterior cover over the cooling channels can be difficult as thermal spraying directly over the cooling channel can result in coating material filling the cooling channel. One method to prevent the coating material from filling the cooling channel includes filling the cooling channel with a sacrificial material prior to coating, then coating the component and subsequently leeching out the sacrificial material. The filling and removing of the sacrificial material can be both difficult and expensive.

As an alternative to filling and leeching, a thin cover layer can be brazed to the substrate, over the cooling channel. However, during the brazing of materials to a surface of the substrate, the brazing temperatures required to sufficiently braze the material may also soften the braze cover material. The softened material can sag or droop into the cooling channels, blocking them as they harden. As such, brazing requires a very narrow temperature range, outside of which the component can be damaged or made unusable.

The above drawbacks are not limited to gas turbines, but rather are expected to be generally applicable to the use of miniature-sized channels for cooling or heating a substrate. A manufacturing method, a thermal management method and a thermal management article that do not suffer from one or more of the above drawbacks would be desirable in the art.

BRIEF DESCRIPTION OF THE INVENTION

In one embodiment, a method for forming a thermal management article includes the steps of providing a substrate with at least one groove, forming at least one duct adapted to be inserted into the at least one groove, and attaching the at least one duct to the at least one groove. The substrate includes a surface having the at least one groove formed therein. The at least one duct includes a length, at least one inner surface, an outer surface, and a wall thickness between the at least one inner surface and the outer surface. The at least one inner surface defines at least one fluid pathway through the at least one duct. The outer surface includes a top portion and a bottom portion. The wall thickness includes a top wall thickness between the top portion of the outer surface and the at least one inner surface. The at least one duct is attached to the at least one groove such that the bottom portion of the outer surface of the at least one duct is within the at least one groove and the top portion of the outer surface of the at least one duct is substantially flush with the surface of the substrate.

In another embodiment, a method for thermal management of a substrate includes the steps of providing a substrate with at least one groove, forming at least one duct adapted to be inserted into the at least one groove, attaching the at least one duct to the at least one groove, and transporting a fluid through the at least one duct to alter the temperature of the substrate. The substrate includes a surface having the at least one groove formed therein. The at least one duct includes a length, at least one inner surface, an outer surface, and a wall thickness between the at least one inner surface and the outer surface. The at least one inner surface defines at least one fluid pathway through the at least one duct. The outer surface includes a top portion and a bottom portion. The wall thickness includes a top wall thickness between the top portion of the outer surface and the at least one inner surface. The at least one duct is attached to the at least one groove such that the bottom portion of the outer surface of the at least one duct is within the at least one groove and the top portion of the outer surface of the at least one duct is substantially flush with the surface of the substrate. The fluid is transported through the at least one duct through the at least one fluid pathway within the at least one inner surface of the at least one duct.

In yet another embodiment, a thermal management article is provided. The thermal management article includes a substrate with a groove, and at least one duct adapted to be inserted into the at least one groove. The substrate includes a surface having the at least one groove formed therein. The at least one duct includes a length, at least one inner surface, an outer surface, and a wall thickness between the at least one inner surface and the outer surface. The at least one inner surface defines at least one fluid pathway through the at least one duct. The outer surface includes a top portion and a bottom portion. The bottom portion is within the at least one groove and the top portion is substantially flush with the surface of the substrate. The wall thickness includes a top wall thickness between the top portion of the outer surface and the at least one inner surface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are manufacturing methods, thermal management methods, and articles for thermal management including ducts. Embodiments of the present disclosure, in comparison to methods and articles that do not include one or more of the features disclosed herein, provide additional temperature alteration, permit temperature alteration in regions where larger channels could not be placed, permit temperature alteration with new materials, permit cooler and/or hotter streams to be directed from flow within turbine components, permit the useful life of turbine components to be extended, permit gas turbine systems using embodiments of the turbine components to be more efficient, permit use of cooler streams to cool hot spots, permit use of hotter streams to heat cool spots, permit adjustable control of temperature and/or temperature uniformity, prevent undesirable effects (for example, thermal fatigue, oxidation, creep, or combinations thereof) through thermal management/distribution, permit use of less expensive materials, permit a reduction of temperature alteration flow (for example, raising efficiency, increasing throughout, and/or reducing emissions), or a combination thereof. Some embodiments of the present disclosure, in comparison to processes and articles that do not include one or more of the features disclosed herein, enable a significant cooling benefit, thereby allowing cooling flow to be reduced, efficiency to be improved, part life to be extended, operation under more extreme condition, or combinations of the preceding effects.

Figure 1:
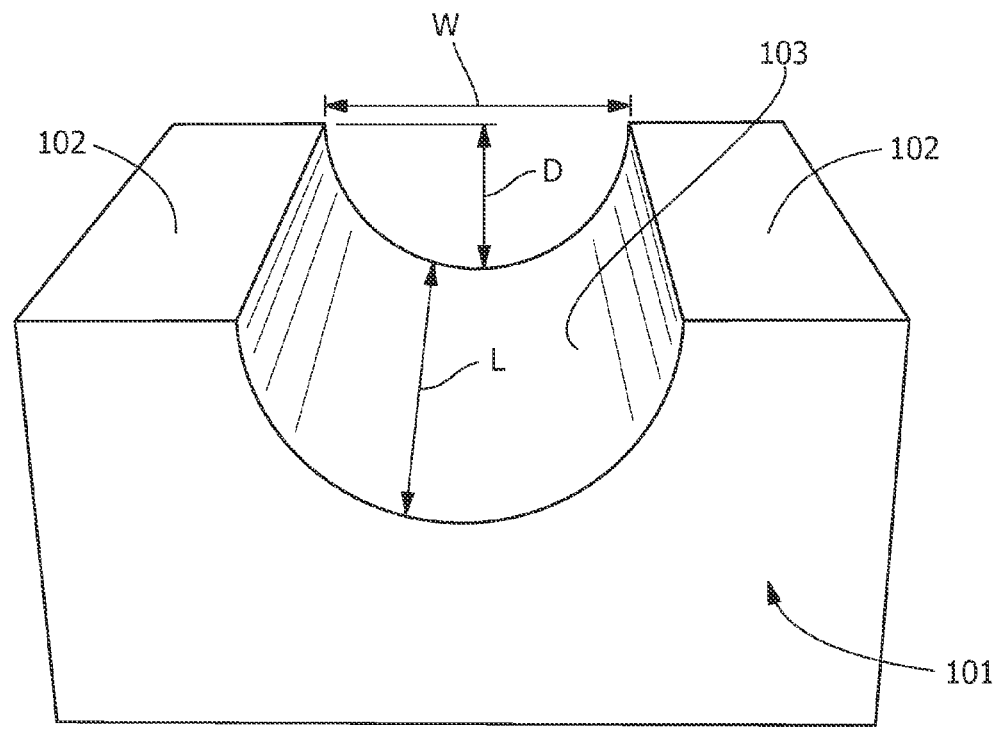
FIG. 1 is a front perspective view of a section of substrate including a groove, according to an embodiment of the disclosure.

Referring to FIG. 1, in one embodiment, a substrate 101 is depicted with a surface 102, and with at least one groove 103 formed therein. Ways to form this arrangement include casting or printing the substrate 101 with the at least one groove 103 already formed therein. Another way to form includes casting or printing the substrate 101 without the at least one groove 103 present and then removing a portion of the surface 102 and the substrate 101 to form the at least one groove 103. A portion of the surface 102 may be removed using common machining techniques such as, but not limited to, lasers, water jets, drills, or any other suitable known method for removing material.

The path of the at least one groove 103 along its length "L" in the substrate 101 may be linear, curved, or may change directions one or more times. The width "W" of the at least one groove 103 may be constant or variable along the length of the at least one groove 103. The depth "D" of the at least one groove 103 relative to the surface 102 may be constant or variable along the length of the at least one groove 103. The surface 102 of the substrate 101 may be flat, curved, angular or irregular.

The at least one groove 103 may have any suitable dimensions. Suitable widths W for the at least one groove 103 include, but are not limited to, between about 0.005 inches to about 0.2 inches, alternatively between about 0.01 inches to about 0.2 inches, alternatively between about 0.005 inches to about 0.1 inches, alternatively between about 0.01 inches to about 0.1 inches, alternatively between about 0.01 inches to about 0.05 inches, alternatively between about 0.05 inches to about 0.1 inches, alternatively between about 0.005 inches to about 0.05 inches, alternatively between about 0.05 inches to about 0.15 inches, or any suitable combination, sub-combination, range, or sub-range therein. Suitable widths W for the at least one groove 103 which exceed the preceding may be beneficial for certain applications in systems with large components such as gas turbine casings.

Suitable lengths L for the at least one groove 103 include, but are not limited to, between about 0.25 to about 24 inches, alternatively between about 0.25 inches to about 12 inches, alternatively between about 0.5 inches to about 6 inches, alternatively between about 1 inch to 3 inches, alternatively between about 0.5 inches to about 2.5 inches, alternatively between about 1.5 inches to about 3.5 inches, alternatively between about 0.5 inches to about 1.5 inches, alternatively between about 1 inch to about 2 inches, alternatively between about 1.5 inches to about 2.5 inches, alternatively between about 2 inches to about 3 inches, alternatively between about 2.5 inches to about 3.5 inches, or any suitable combination, sub-combination, range, or sub-range therein. Suitable lengths L for the at least one groove 103 which exceed the preceding may be beneficial for certain applications in systems with large components such as gas turbine casings.

Suitable depths D for the at least one groove 103 include, but are not limited to, between about 0.005 inches to about 0.2 inches, alternatively between about 0.01 inches to about 0.2 inches, alternatively between about 0.005 inches to about 0.1 inches, alternatively between about 0.01 inches to about 0.1 inches, alternatively between about 0.01 inches to about 0.05 inches, alternatively between about 0.05 inches to about 0.1 inches, alternatively between about 0.005 inches to about 0.05 inches, alternatively between about 0.05 inches to about 0.15 inches, or any suitable combination, sub-combination, range, or sub-range therein. Suitable depths D for the at least one groove 103 which exceed the preceding may be beneficial for certain applications in systems with large components such as gas turbine casings.

Figure 2:
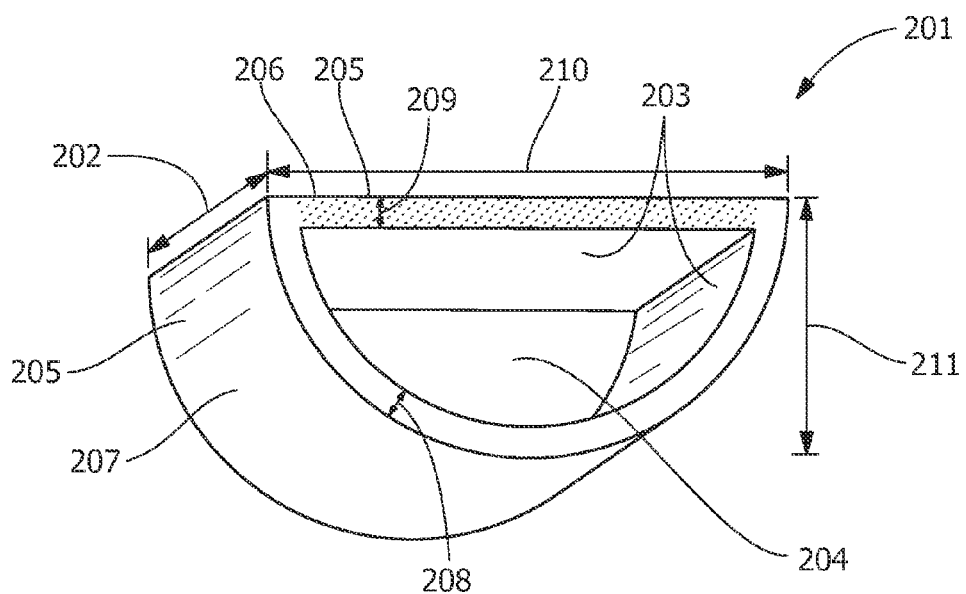
FIG. 2 is a perspective view along the length of a duct, according to an embodiment of the disclosure.

Referring to FIG. 2, in one embodiment, at least one duct 201 is depicted. The at least one duct 201 includes a length 202, at least one inner surface 203, at least one fluid pathway 204 defined by the at least one inner surface 203, an outer surface 205, and a wall thickness 208. The outer surface 205 includes a top portion 206 and a bottom portion 207. The wall thickness 208 includes a top wall thickness 209 between the top portion 206 of the outer surface 205 and the at least one inner surface 203. The width 210 of the at least one duct 201 may be constant or variable along the length 202 of the at least one duct 201. The depth 211 of the at least one duct 201 relative to the top portion 206 of the outer surface 205 may be constant or variable along the length 202 of the at least one duct 201.

The at least one duct 201 has any suitable dimensions adapted to and changing with the dimensions of the at least one groove 103 and the surface 102 of the substrate 101. Suitable widths 210 for the at least one duct 201 include, but are not limited to, between about 0.005 inches to about 0.2 inches, alternatively between about 0.01 inches to about 0.2 inches, alternatively between about 0.005 inches to about 0.1 inches, alternatively between about 0.01 inches to about 0.1 inches, alternatively between about 0.01 inches to about 0.05 inches, alternatively between about 0.05 inches to about 0.1 inches, alternatively between about 0.005 inches to about 0.05 inches, alternatively between about 0.05 inches to about 0.15 inches, or any suitable combination, sub-combination, range, or sub-range therein. Without being bound by theory, it would be expected that a reduction of the width 210 of the at least one duct 201 would result in an increase of the heat transfer coefficient for the at least one duct 201 on the substrate 101, providing a significant cooling benefit, and thereby allowing cooling flow to be reduced, efficiency to be improved, part life to be extended, operation under more extreme condition, or combinations of the preceding effects. Suitable widths 210 for the at least one duct 201 which exceed the preceding may be beneficial for certain applications in systems with large components such as gas turbine casings.

Suitable lengths 202 for the at least one duct 201 include, but are not limited to, between about 0.25 inches to about 24 inches, alternatively between about 0.25 inches to about 12 inches, alternatively between about 0.5 inches to about 6 inches, alternatively between about 1 inch to 3 inches, alternatively between about 0.5 inches to about 2.5 inches, alternatively between about 1.5 inches to about 3.5 inches, alternatively between about 0.5 inches to about 1.5 inches, alternatively between about 1 inch to about 2 inches, alternatively between about 1.5 inches to about 2.5 inches, alternatively between about 2 inches to about 3 inches, alternatively between about 2.5 inches to about 3.5 inches, or any suitable combination, sub-combination, range, or sub-range therein. Suitable lengths 202 for the at least one duct 201 which exceed the preceding may be beneficial for certain applications in systems with large components such as gas turbine casings.

Suitable depths 211 for the at least one duct 201 include, but are not limited to, between about 0.005 inches to about 0.2 inches, alternatively between about 0.01 inches to about 0.2 inches, alternatively between about 0.005 inches to about 0.1 inches, alternatively between about 0.01 inches to about 0.1 inches, alternatively between about 0.01 inches to about 0.05 inches, alternatively between about 0.05 inches to about 0.1 inches, alternatively between about 0.005 inches to about 0.05 inches, alternatively between about 0.05 inches to about 0.15 inches, or any suitable combination, sub-combination, range, or sub-range therein. Without being bound by theory, it would be expected that a reduction of the depth 211 of the at least one duct 201 below the surface 102 would result in a decrease of thermal resistance for the at least one duct 201 on the substrate 101, providing a significant cooling benefit, and thereby allowing cooling flow to be reduced, efficiency to be improved, part life to be extended, operation under more extreme condition, or combinations of the preceding effects. Suitable depths 211 for the at least one duct 201 which exceed the preceding may be beneficial for certain applications in systems with large components such as gas turbine casings.

Suitable thicknesses for the top wall thickness 209 include, but are not limited to, between about 0.005 inches to about 0.05 inches, alternatively between about 0.005 inches to about 0.04 inches, alternatively between about 0.005 inches to about 0.03 inches, alternatively between about 0.005 inches to about 0.02 inches, alternatively between about 0.005 inches to about 0.015 inches, alternatively between about 0.005 inches to about 0.01 inches, alternatively between about 0.04 inches to about 0.05 inches, alternatively between about 0.03 inches to about 0.04 inches, alternatively between about 0.02 inches to about 0.03 inches, alternatively between about 0.01 inches to about 0.02 inches, alternatively between about 0.01 inches to about 0.015 inches, alternatively less than about 0.05 inches, alternatively less than about 0.04 inches, alternatively less than about 0.03 inches, alternatively less than about 0.02 inches, alternatively less than about 0.015 inches, alternatively less than about 0.01 inches, alternatively about 0.005 inches, or any suitable combination, sub-combination, range, or sub-range therein. Without being bound by theory, it would be expected that a reduction of top wall thickness 209 of the at least one duct 201 would result in a decrease of thermal resistance for the at least one duct 201 on the substrate 101, providing a significant cooling benefit, and thereby allowing cooling flow to be reduced, efficiency to be improved, part life to be extended, operation under more extreme condition, or combinations of the preceding effects.

In one embodiment, the at least one fluid pathway 204 geometry may change along the length 202 of the at least one duct 201. The changes in geometry may be designed so as to maximize or minimize the alteration of temperature at any particular location along the length 202 of the at least one duct 201 in the substrate 101. The changes in geometry may enable highly specific manipulation of the thermal characteristics of the substrate 101 by the at least one duct 201. The geometry of the at least one fluid pathway 204 may be altered without requiring a change in the dimensions of the outer surface 205 of the at least one duct 201, which may enable substitution of the at least one duct 201 without requiring any alteration of the design of the at least one groove 103. The geometry changes may enable the modification of an existing thermal management article or the modification of the thermal management properties of a thermal management article with minimized cost and time compared to methods and articles that do not include one or more of the features disclosed herein.

The at least one duct 201 may be formed by any suitable method. In one embodiment, the at least one duct 201 may be formed by a three-dimensional printing process. Examples of three-dimensional printing processes include, but are not limited to, the processes known to those of ordinary skill in the art as Direct Metal Laser Melting ("DMLM"), Direct Metal Laser Sintering ("DMLS"), Selective Laser Sintering ("SLS"), Selective Laser Melting ("SLM"), and Electron Beam Melting ("EBM"). As used herein, the term "three-dimensional printing process" refers to the processes described above as well as other suitable current or future processes that include the build-up of materials layer by layer. Three-dimensional printing processes may enable the geometry of the at least one duct 201 to conform to the geometry of the at least one groove 103.

In general, the three-dimensional printing processes comprise distributing a material to a selected region and selectively melting or sintering the material with a laser or electron beam, or an equivalent process. A predetermined design file or two-dimensional slices of a three-dimensional file, for example, may be utilized from a computer-aided design program. The material may be in the form of atomized powder. Suitable materials for three-dimensional printing processes may include, but are not limited to, plastic, thermoplastic, metal, metallic, ceramic, other suitable materials, or a combination thereof. Suitable materials for the atomized powder may include, but are not limited to, stainless steel, tool steel, cobalt chrome, titanium, nickel, aluminum, alloys thereof, and combinations thereof.

In one embodiment, the material for the atomized powders may include metal alloys, including nickel and cobalt-based superalloys, stainless and alloy steels, and titanium, aluminum and vanadium alloys. A suitable example of a cobalt-based alloy may have a formula (by mass) of $Co_{0.39-0.41}Cr_{0.19-0.21}Ni_{0.14-0.16}Fe_{0.113-0.205}Mo_{0.06-0.08}Mn_{0.015-0.025}$ (commercially available as Co—Cr—Ni alloy). A suitable example of a nickel-based alloy may have a formula (by mass) of $Ni_{0.50-0.55}Cr_{0.17-0.21}Fe_{balance}Mo_{0.028-0.033}Nb_{0.0475-0.055}Co_{0.01}Mn_{0.0035}Cu_{0.002-0.008}Al_{0.0065-0.0115}Ti_{0.003}$ (commercially available as Inconel 718) or a formula (by mass) of $Ni_{balance}Cr_{0.20-0.23}Fe_{0.05}Mo_{0.08-0.10}Nb+Ta_{0.0315-0.0415}Co_{0.01}Mn_{0.005}Al_{0.004}Ti_{0.004}$ (commercially available as Inconel 625). Suitable examples of titanium-based alloys include those known by the trade names Ti-6Al-4Va and Aluminum 6061.

In one embodiment, the at least one duct 201 and the at least one groove 103 may include features adapted to permit a fluid to enter the at least one duct 201 from the substrate 101 and exit the at least one duct 201 to the exterior environment or to a pathway within the substrate 101. In one embodiment these features may be included in the at least one duct 201 and the at least one groove 103 prior to the at least one duct 201 being placed within the at least one groove 103. In an alternative embodiment, some or all of these features may be formed in the at least one duct 201 and the at least one groove 103 following placement of the at least one duct 201 within the at least one groove 103.

In one embodiment, the material for the at least one duct 201 may be the same as the material from which the substrate 101 is formed. In another embodiment, the material for the at least one duct 201 may be different from the material from which the substrate 101 is formed. In one embodiment, the material for the at least one duct 201 may be chosen so as to have a higher thermal conductivity than the material from which the substrate 101 is formed, thereby enabling increased efficiency and requiring less fluid to be used to alter the temperature of the substrate 101.

Figure 3:
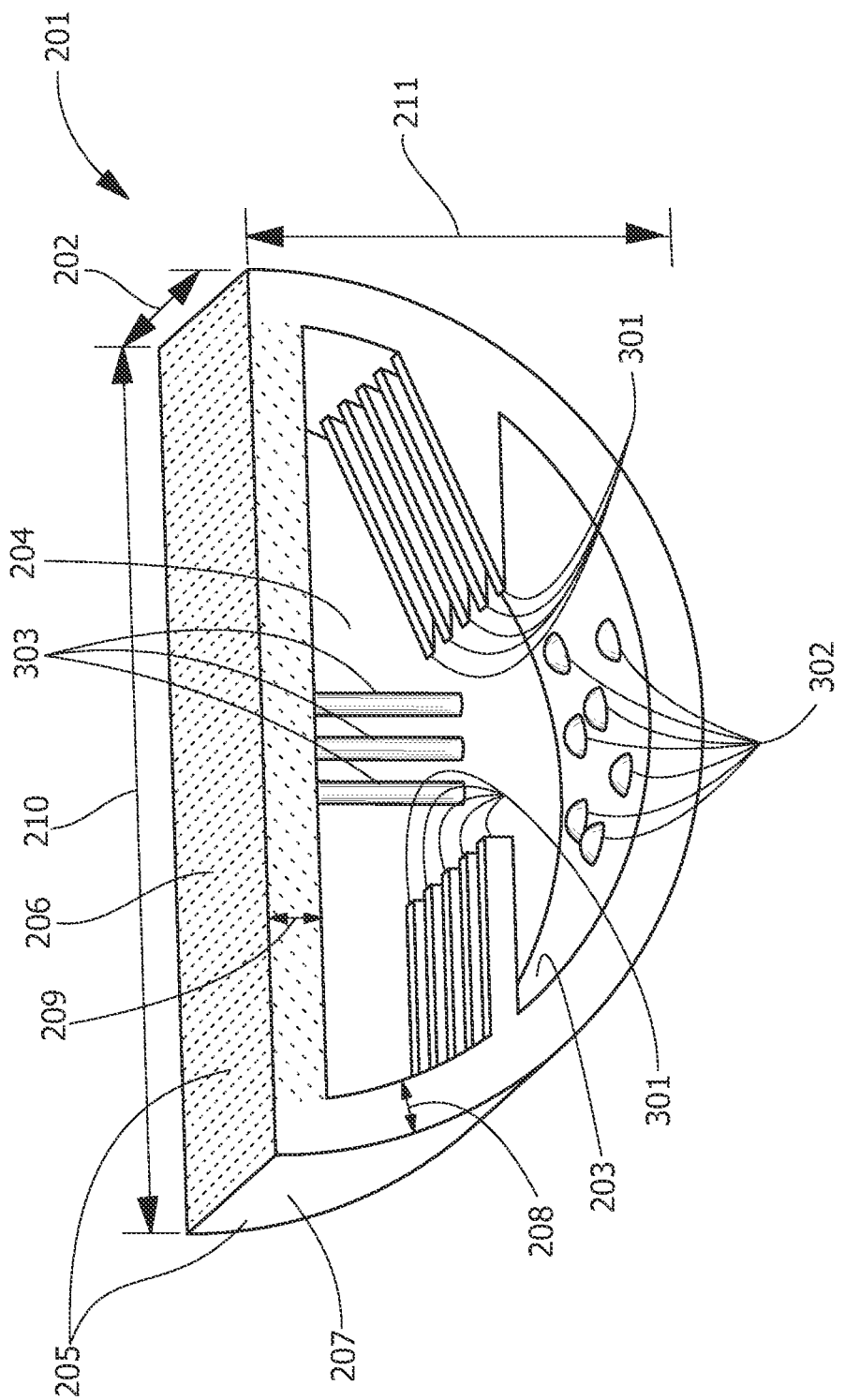
FIG. 3 is a front perspective view of a section of duct including features that disrupt laminar flow of a fluid, according to an embodiment of the disclosure.

Referring to FIG. 3, in one embodiment, the at least one inner surface 203 of the at least one duct 201 may include at least one feature to disrupt laminar flow of a fluid through the at least one fluid pathway 204. The at least one feature to disrupt laminar flow may include turbulators 301, 302 and 303, which mix the fluid in the at least one fluid pathway 204 from the middle to the sides and from the sides to the middle, making the at least one fluid pathway 204 effectively longer. Turbulators 301, 302 and 303 may also increase the surface area of the at least one inner surface 203, which increases heat transfer from or to the fluid flowing through the at least one fluid pathway 204 to or from the substrate 101. Suitable examples of turbulators include, but are not limited to, fins 301, bumps 302 and pins 303. Turbulators 301, 302 and 303 may be of any suitable shape or size, and may be included on the at least one inner surface 203 in any suitable arrangement or spacing to achieve the desired effect. Turbulators 301, 302 and 303 may be formed within the at least one duct 201 using a three-dimensional printing process, resulting in a single homogeneous piece.

Figure 4:
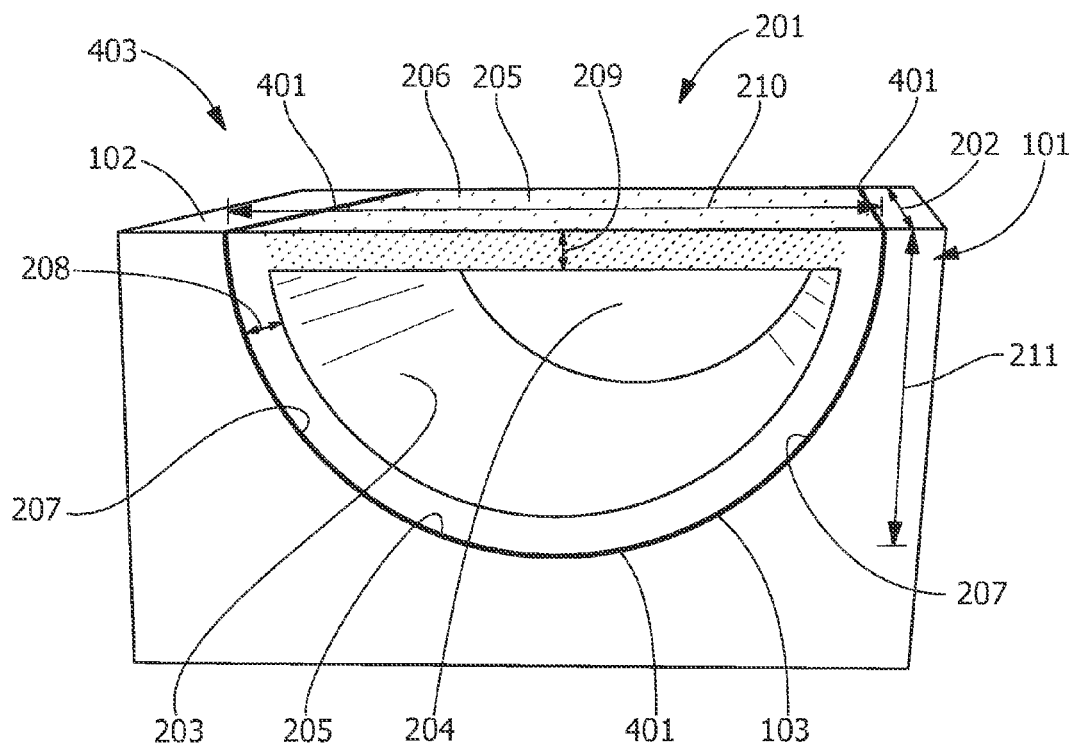
FIG. 4 is a front perspective view of a section of a brazed thermal management article, according to an embodiment of the disclosure.

Referring to FIG. 4, in one embodiment, the at least one duct 201 may be attached to the at least one groove 103 and the surface 102 of the substrate 101 by brazing to form a thermal management article 403. The at least one duct 201 is positioned such that the bottom portion 207 of the outer surface 205 of the at least one duct 201 is within the at least one groove 103 and the top portion 206 of the outer surface 205 of the at least one duct 201 is substantially flush with the surface 102 of the substrate 101. After the at least one duct 201 is positioned, the at least one inner surface 203 is brazed to the at least one groove 103, resulting in a braze layer 401. The braze layer 401 connects the at least one duct 201 to the at least one groove 103, forming the thermal management article 403.

Brazing may be accomplished by any suitable brazing technique. The braze layer 401 may be any suitable brazing material, including, but not limited to, metal alloys and superalloys, including nickel and cobalt-based superalloys, alloys and combinations thereof. Suitable examples of a nickel-based alloy may have a formula (by mass) of $Ni_{0.6715}Cr_{0.14}B_{0.0275}Co_{0.1}Al_{0.035}Ta_{0.025}Y_{0.001}$ (commercially available as Amdry DF4B from Sulzer Metco, located in Westbury, N.Y.) or a formula (by mass) of $Ni_{0.71}Cr_{0.019}Si_{0.10}$ (commercially available as BNi-5 from many providers, including Wall Colmonoy, located in Madison Heights, Mich.). The braze layer 401 may enable a fit tolerance between the bottom portion 207 of the outer surface 205 of the at least one duct 201 and the inner surface of the at least one groove 103 in the surface 102 of the substrate 101 of between about 0.0005 inches to about 0.008 inches. The braze layer 401 may fill minor contact gaps between the at least one duct 201 and the at least one groove 103 without significantly effecting thermal management properties.

Figure 5:
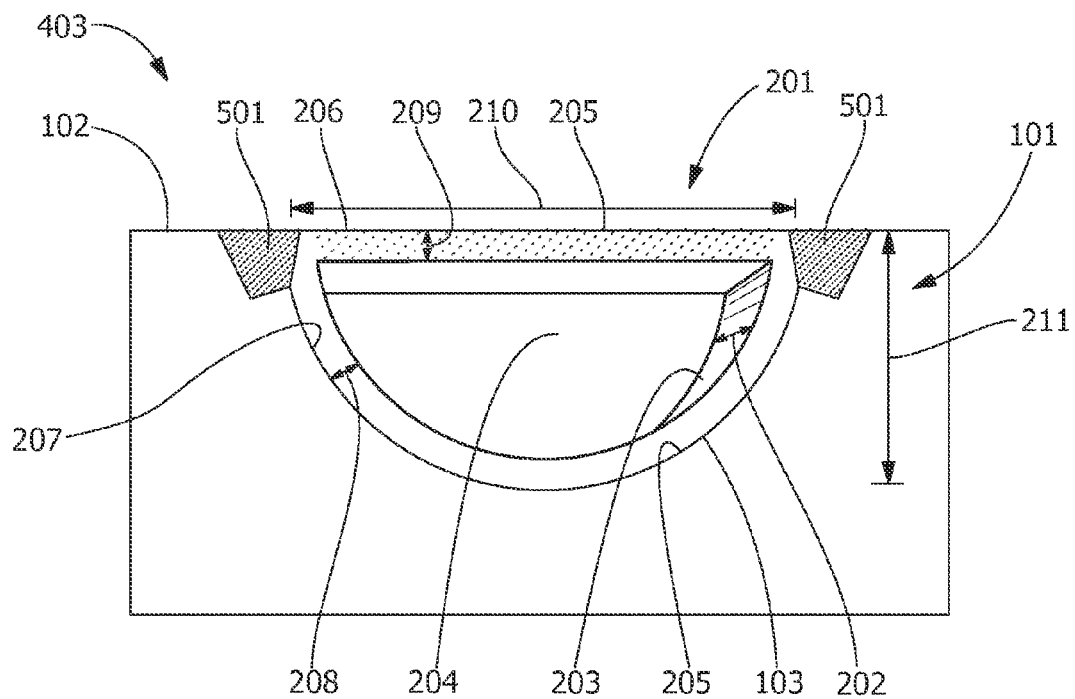
FIG. 5 is a front view of a section of a welded thermal management article, according to an embodiment of the disclosure.

Referring to FIG. 5, in one embodiment, the at east one duct 201 may be attached to the at least one groove 103 by welding to form a thermal management article 403. The at least one duct 201 is positioned such that the bottom portion 207 of the outer surface 205 of the at least one duct 201 is within the at least one groove 103 and the top portion 206 of the outer surface 205 of the at least one duct 201 is substantially flush with the surface 102 of the substrate 101. At least a portion of the outer surface 205 of the at least one duct 201 is welded to the at least one groove 103, resulting in at least one weld zone 501. The at least one weld zone 501 connects the at least one duct 201 to the substrate 101, forming the thermal management article 103.

Welding may be accomplished by any suitable welding technique, including, but not limited to, gas tungsten arc welding ("GTAW"). Following welding, the at least one weld zone 501 may be machined or blended by any suitable method to make the at least one weld zone 501 substantially flush with the surface 102 of the substrate 101 and the top portion 206 of the outer surface 205 of the at least one duct 201. Post-welding finishing operations may be applied to make the top portion 206 of the outer surface 205 of the at least one duct 201, the surface 102 of the substrate 101, and the at least one weld zone 501 more flush. Suitable examples of post-welding finishing operations include, but are not limited to, grinding, blending and machining.

As shown in embodiments in FIGS. 4 and 5, the attachment of at least one duct 201 to the at least one groove 103 in the surface 102 of a substrate 101 forms a thermal management article 403. A fluid may be transported through the at least one fluid pathway 204 within the at least one inner surface 203 of the at least one duct 201 to alter the temperature of the substrate 101.

In one embodiment the top portion 206 of the outer surface 205 of the at least one duct 201 and the surface 102 of the substrate 101 define a combined surface which is planar, curved, partially curved and partially planar, or a more complicated geometry, wherein the top portion 206 is substantially flush and continuous with the surface 102 at all points where the top portion 206 and the surface 102 meet. In another embodiment, the top portion 206 of the outer surface 205 of the at least one duct 201, the surface 102 of the substrate 101, and the braze layer 401 define a combined surface which is planar, curved, partially curved and partially planar, or a more complicated geometry, wherein the top portion 206 is substantially flush and continuous with the surface 102 and the braze layer 401 at all points where the top portion 206, the surface 102 and the braze layer 401 meet. In yet another embodiment, the top portion 206 of the outer surface 205 of the at least one duct 201, the surface 102 of the substrate 101, and the weld zone 501 define a combined surface which is planar, curved, partially curved and partially planar, or a more complicated geometry, wherein the top portion 206 is substantially flush and continuous with the surface 102 and the weld zone 501 at all points where the top portion 206, the surface 102 and the weld zone 501 meet.

Figure 6:
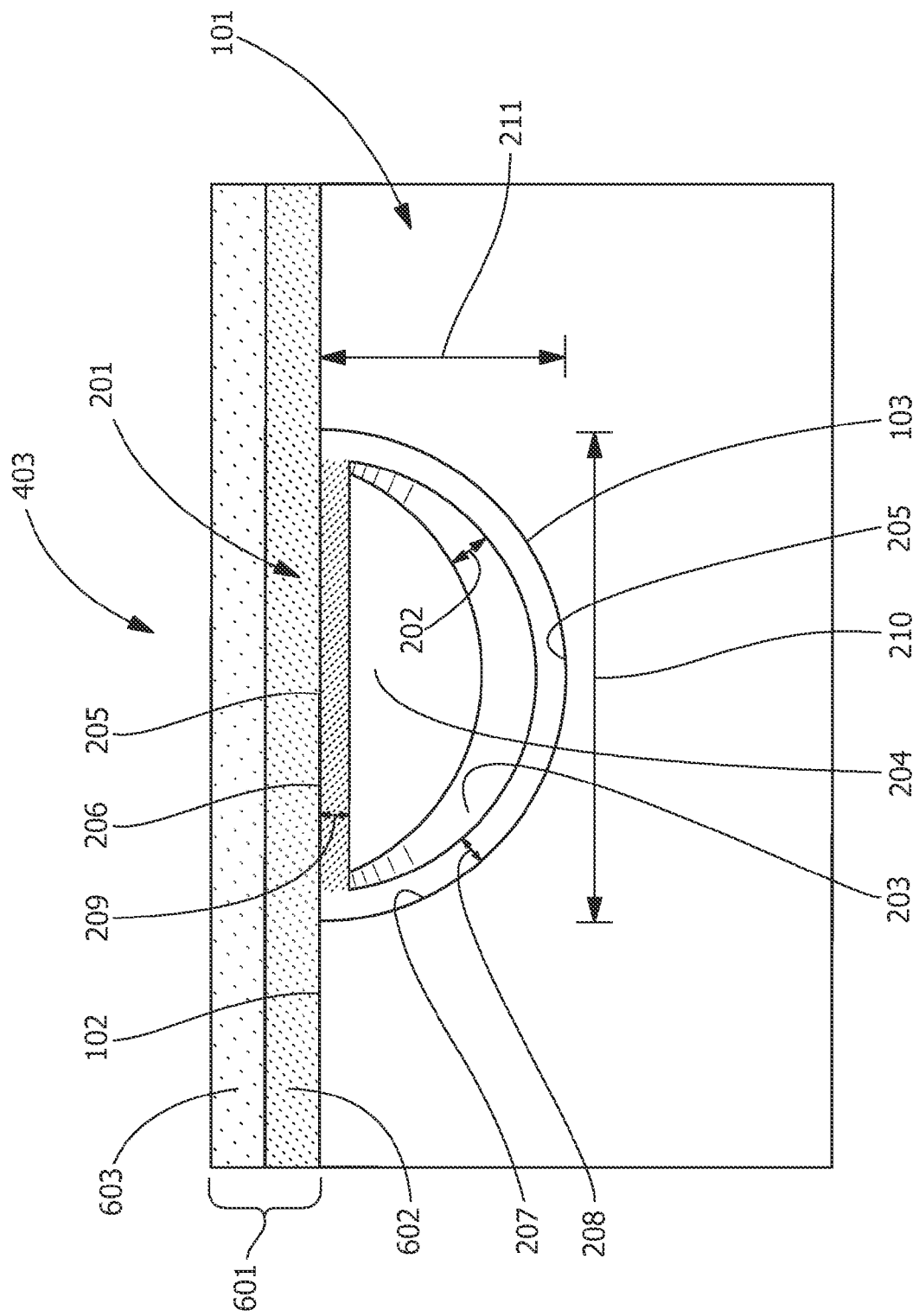
FIG. 6 is a front view of a section of a thermal management article including a protective coating, according to an embodiment of the disclosure.

Referring to FIG. 6, in one embodiment, following attachment of the at least one duct 201 to the at least one groove 103, a protective coating 601 may be applied to the surface 102 of the substrate 101 and top portion 206 of the outer surface 205 of the at least one duct 201. The protective coating 601 may be any suitable coating. The protective coating 601 may include, but is not limited to, any suitable bond coating 602 and/or any suitable thermal barrier coating 603. In one embodiment the protective coating 601 may include a plurality of layers of any suitable bond coating 602, a plurality of layers of any suitable thermal barrier coating 603, or both.

Figure 7:
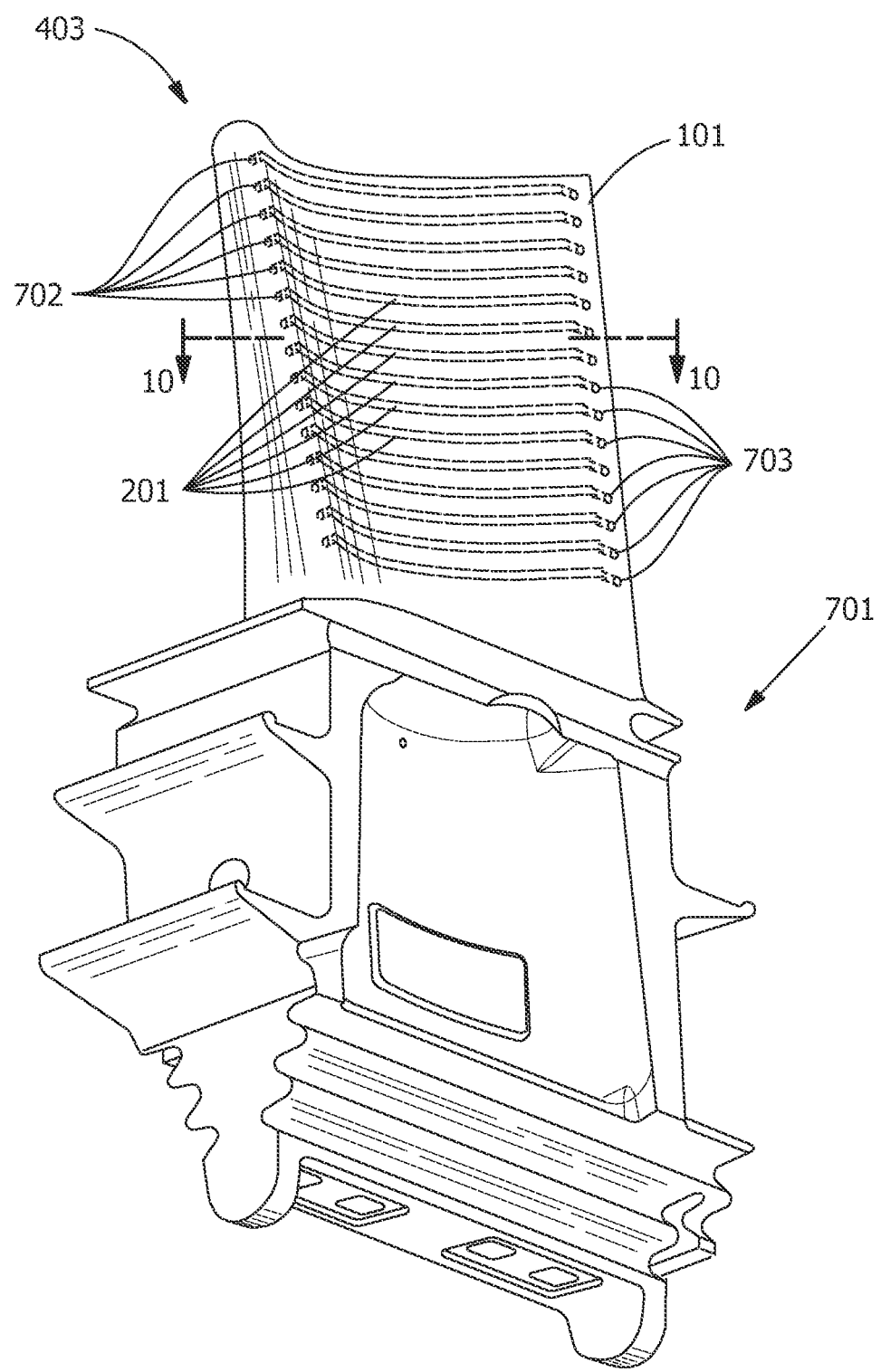
FIG. 7 is a perspective view of a thermal management article, the substrate being a turbine bucket, according to an embodiment of the disclosure.

As shown in FIG. 7, in one embodiment, the substrate 101 may be a turbine bucket 701. The course of the at least one duct 201 of the thermal management article 403 through the turbine bucket 701 is indicated with dashed lines. The at least one supply passage 702 and the at least one exit passage 703 for a fluid to flow through the at least one duct 201 are also shown. The orientation of the at least one duct 201 through the turbine bucket shown in FIG. 7 is for illustrate purposes only. In differing embodiments, the orientation of the at least one duct 201 through the turbine bucket 701 may be at any orientation relative to the turbine bucket 701, including, but not limited to, perpendicular to the orientation depicted in FIG. 7.

Figure 8:
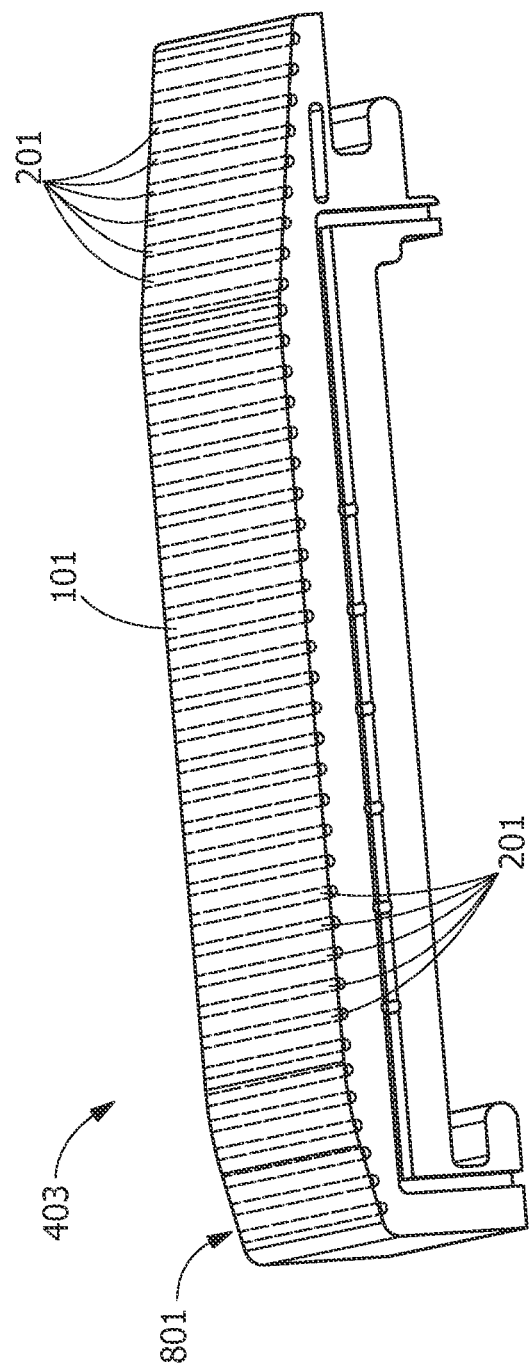
FIG. 8 is a perspective view of a thermal management article, the substrate being a turbine shroud, according to an embodiment of the disclosure.

As shown in FIG. 8, in one embodiment, the substrate 101 may be a turbine shroud 801. The ends of a number of the at least one ducts 201 of the thermal management article 403 are visible, and the course of the at least one duct 201 through the turbine shroud 801 is indicated with dashed lines. The orientation of the at least one duct 201 through the turbine shroud shown in FIG. 8 is for illustrate purposes only. In differing embodiments, the orientation of the at least one duct 201 through the turbine shroud 801 may be at any orientation relative to the turbine shroud 801, including, but not limited to perpendicular to the orientation depicted in FIG. 8.

Figure 9:
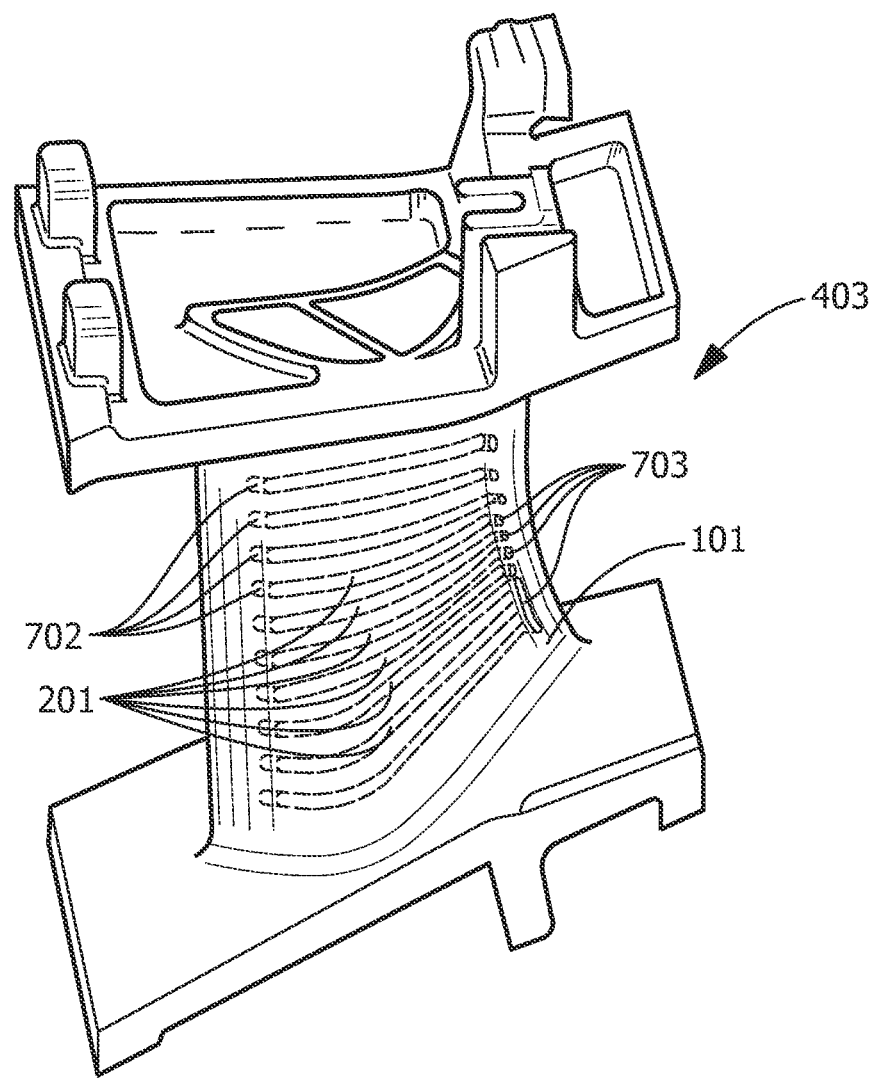
FIG. 9 is a perspective view of a thermal management article, the substrate being a turbine nozzle, according to an embodiment of the disclosure.

As shown in FIG. 9, in one embodiment, the substrate 101 may be a turbine nozzle 901. The course of the at least one duct 201 of the thermal management article 403 through the turbine nozzle 901 is indicated with dashed lines, and the at least one supply passage 702 and the at least one exit passage 703 for a fluid to flow through the at least one duct 201 are also shown. The orientation of the at least one duct 201 through the turbine nozzle shown in FIG. 9 is for illustrate purposes only. In differing embodiments, the orientation of the at least one duct 201 through the turbine nozzle 901 may be at any orientation relative to the turbine nozzle 901, including, but not limited to, perpendicular to the orientation depicted in FIG. 9.

Figure 10:
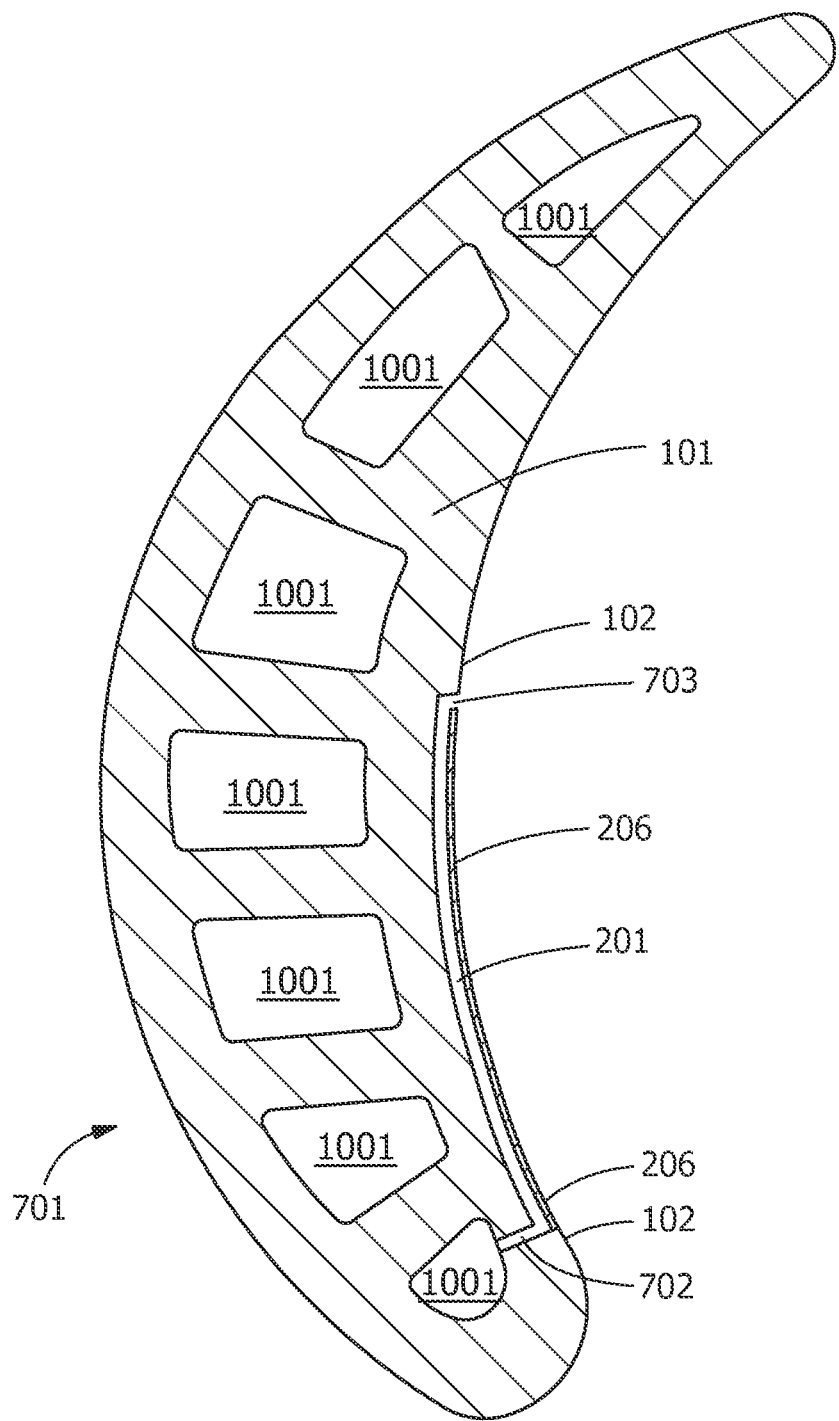
FIG. 10 is a cross-sectional view along line 10-10 of FIG. 7 of the thermal management article, illustrating at least one duct including supply and exit passages, according to an embodiment of the disclosure.

As shown in FIG. 10, in one embodiment, the at least one supply passage 702 from the at least one fluid transport cavity 1001 to the at least one duct 201 permits a fluid to enter the at least one duct 201. The at least one exit passage 703 permits a fluid to exit the at least one duct 201 to the exterior environment on surface 102 of substrate 101. In an alternative embodiment, the at least one exit passage 703 may engage the at least one duct 201 with a second fluid transport cavity 1001. In another embodiment, the at least one exit passage 703 may engage the at least one duct 201 with a second supply passage 702 engaged with a second duct 201. In yet another embodiment, the at least one exit passage 703 may define a cylindrical hole, but in yet another embodiment, the at least one exit passage 703 may define a hole with a shape adapted to enable a fluid exiting the at least one duct 201 to provide film coverage to a downstream portion of the thermal management article 403. The at least one exit passage 703 may also define a trench where fluid from one or more ducts 201 enters to spread along the trench and then exit the trench as film (see FIG. 7).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for forming a thermal management article comprising the steps of:
   providing a substrate, wherein the substrate includes a surface, and wherein the surface includes at least one groove formed therein, the at least one groove including a groove geometry;
   forming at least one duct adapted to be inserted into the at least one groove, forming the at least one duct including forming the at least one duct to have a duct geometry, wherein the at least one duct includes:
      a length;
      at least one inner surface defining at least one fluid pathway through the at least one duct;
      an outer surface including a top portion and a bottom portion, the duct geometry at the bottom portion conforming to the groove geometry and the duct geometry at the top portion conformed to be substantially flush with the surface of the substrate; and
      a wall thickness between the at least one inner surface and the outer surface, wherein the wall thickness includes a top wall thickness between the top portion of the outer surface and the at least one inner surface; and
   then inserting the at least one duct into the at least one groove and attaching the at least one duct to the at least one groove, wherein the bottom portion of the outer surface of the at least one duct is within the at least one groove and the top portion of the outer surface of the at least one duct is substantially flush with the surface of the substrate.

2. The method of claim 1, wherein the top wall thickness is less than about 0.02 inches.

3. The method of claim 1, wherein the at least one fluid pathway has a fluid pathway geometry, and wherein the fluid pathway geometry changes along the length of the at least one duct.

4. The method of claim 1, wherein the at least one inner surface of the at least one duct comprises at least one feature to disrupt laminar flow of a fluid both prior to and following inserting the at least one duct into the at least one groove.

5. The method of claim 1, wherein the substrate is a turbine component selected from the group consisting of a turbine shroud, a turbine bucket, turbine nozzle, or combinations thereof.

6. The method of claim 1, wherein attaching the at least one duct to the at least one groove comprises welding or brazing the at least one duct to the at least one groove.

7. The method of claim 1, wherein the at least one duct is formed by a three-dimensional printing process.

8. The method of claim 7, wherein the three-dimensional printing process comprises distributing a material to a selected region and selectively melting the material with a laser or electron beam.

9. A method for thermal management of a substrate comprising the steps of:
   providing a substrate, wherein the substrate includes a surface, and wherein the surface includes at least one groove formed therein, the at least one groove including a groove geometry;
   forming at least one duct adapted to be inserted into the at least one groove, forming the at least one duct including forming the at least one duct to have a duct geometry, wherein the at least one duct includes:
      a length;
      at least one inner surface defining at least one fluid pathway through the at least one duct;
      an outer surface including a top portion and a bottom portion, the duct geometry at the bottom portion conforming to the groove geometry and the duct geometry at the top portion conformed to be substantially flush with the surface of the substrate; and
      a wall thickness between the at least one inner surface and the outer surface, wherein the wall thickness includes a top wall thickness between the top portion of the outer surface and the at least one inner surface;
   then inserting the at least one duct into the at least one groove and attaching the at least one duct to the at least one groove, wherein the bottom portion of the outer surface of the at least one duct is within the at least one groove and the top portion of the outer surface of the at least one duct is substantially flush with the surface of the substrate; and
   transporting a fluid through the at least one fluid pathway within the at least one inner surface of the at least one duct to alter the temperature of the substrate.

10. The method of claim 9, wherein the top wall thickness is less than about 0.02 inches.

11. The method of claim 9, wherein the at least one fluid pathway has a fluid pathway geometry, and wherein the fluid pathway geometry changes along the length of the at least one duct.

12. The method of claim 9, wherein the at least one inner surface of the at least one duct comprises at least one feature to disrupt laminar flow of a fluid both prior to and following inserting the at least one duct into the at least one groove.

13. The method of claim 9, wherein the substrate is a turbine component selected from the group consisting of a turbine shroud, a turbine bucket, turbine nozzle, or combinations thereof.

14. The method of claim 9, wherein attaching the at least one duct to the at least one groove comprises welding or brazing the at least one duct to the at least one groove.

15. The method of claim 9, wherein the at least one duct is formed by a three-dimensional printing process.

16. The method of claim 15, wherein the three-dimensional printing process comprises distributing a material to a selected region and selectively melting the material with a laser or electron beam.

17. A thermal management article, comprising:
   a substrate, wherein the substrate includes a surface, and wherein the surface includes at least one groove formed therein; and
   at least one duct inserted into the at least one groove, wherein the at least one duct is a single homogenous piece including:
      a length;
      at least one inner surface defining at least one fluid pathway through the at least one duct;
      an outer surface including a top portion and a bottom portion, wherein:
         the bottom portion is within the at least one groove; and
         the top portion is substantially flush with the surface of the substrate; and
      a wall thickness between the at least one inner surface and the outer surface, wherein the wall thickness includes a top wall thickness between the top portion of the outer surface and the at least one inner surface,
   wherein the thermal management article is a turbine component.

18. The article of claim 17, wherein the top wall thickness is less than about 0.02 inches.

19. The article of claim 17, wherein the at least one fluid pathway has a fluid pathway geometry, and wherein the fluid pathway geometry changes along the length of the at least one duct.

20. The article of claim 17, wherein the at least one inner surface of the at least one duct comprises a feature to disrupt laminar flow of a fluid.

21. The article of claim 17, wherein the at least one duct is attached to the substrate by at least one of a braze layer and a weld zone.

22. The article of claim 17, wherein the at least one duct includes a material composition selected from the group consisting of nickel-based superalloys, cobalt-based superalloys, stainless steels, alloy steels, titanium alloys, aluminum alloys, vanadium alloys, and combinations thereof.

23. The article of claim 22, wherein the at least one duct is attached to the substrate by at least one of a braze layer and a weld zone.

* * * * *